United States Patent
Wu

(10) Patent No.: US 11,034,327 B2
(45) Date of Patent: Jun. 15, 2021

(54) WINDING DEVICE OF SAFETY BELT

(71) Applicant: TAIWAN RACING PRODUCTS CO., LTD., Hemei Township, Changhua County (TW)

(72) Inventor: Wen-Yuan Wu, Dacun Township (TW)

(73) Assignee: TAIWAN RACING PRODUCTS CO., LTD., Hemei Township (TW)

( * ) Notice: Subject to any disclaimer, the term of this patent is extended or adjusted under 35 U.S.C. 154(b) by 352 days.

(21) Appl. No.: 16/252,797

(22) Filed: Jan. 21, 2019

(65) Prior Publication Data

US 2020/0231116 A1    Jul. 23, 2020

(51) Int. Cl.
*B60R 22/44* (2006.01)
*B60R 22/46* (2006.01)

(52) U.S. Cl.
CPC .............................. *B60R 22/4671* (2013.01)

(58) Field of Classification Search
CPC .......................... B60R 22/44; B60R 22/4671
See application file for complete search history.

(56) References Cited

U.S. PATENT DOCUMENTS 3,826,473 A * 7/1974 Huber ................... B60P 7/0861
                                              242/388.3
8,042,235 B2 * 10/2011 Wu ..................... A44B 11/2526
                                              24/323
9,162,605 B2 * 10/2015 Durand .................. B60P 7/083

* cited by examiner

*Primary Examiner* — Sang K Kim
(74) *Attorney, Agent, or Firm* — Alan D. Kamrath; Karin L. Williams; Mayer & Williams PC

(57) ABSTRACT

A winding device includes a base, a driving member and two operation gears. The winding device further includes two shafts extending through each of the arms, each of the operation gears, and each of the ears. The base is provided with two arms. The driving member is provided with two ears. Each of the operation gears has a plurality of toothed portions and a plurality of push grooves. Each of the toothed portions has a release face. Each of the arms is provided with a first slideway in which a first push member is slidably mounted. Each of the ears is provided with a second slideway in which a second push member is slidably mounted. Thus, the driving member is driven reciprocally to wind the safety belt gradually, such that the tension of the safety belt is adjusted.

10 Claims, 4 Drawing Sheets

WINDING DEVICE OF SAFETY BELT

BACKGROUND OF THE INVENTION

1. Field of the Invention

The present invention relates to a winding device and, more particularly, to a winding device of a safety belt.

2. Description of the Related Art

A seat belt has a length that is adjusted manually or automatically to a predetermined value, such that the human body is fixed to the seat by the seat belt, to prevent the human body from being thrown away from the car due to the gravity during occurrence of an accident. The seat belt is a multi-point type safety belt and includes multiple ropes (or cords or lines or straps or belts). A conventional automatic winding device is used for winding the seat belt automatically. However, the conventional automatic winding device has a higher cost of production and occupies a larger space. A conventional manually operated adjusting structure, that is commercially available, is used for changing and adjusting the length of the seat belt manually by rope fasteners (or buckles). Thus, after each of the ropes is adjusted to have a suitable length, the multi-point seat belt is tied or connected. In practice, the seat belt needs to be adjusted slightly to adjust the tightness after the seat belt is connected. However, it is difficult for the user to adjust the seat belt slightly after the seat belt is connected, such that the user needs help of other people, thereby causing inconvenience to the user in adjustment of the seat belt.

BRIEF SUMMARY OF THE INVENTION

The primary objective of the present invention is to provide a winding device for winding a safety belt of a car.

In accordance with the present invention, there is provided a winding device comprising a base, a driving member and two operation gears. The base is provided with two arms. Each of the two arms is provided with a through hole. The base is provided with a receiving section located between the two arms. The driving member is provided with two ears. Each of the two ears is provided with a mounting hole. Each of the two operation gears is provided with two apertures and a partition located between the two apertures. The winding device further comprises two shafts in turn extending through the through hole of each of the two arms, each of the two apertures of each of the two operation gears, and the mounting hole of each of the two ears. Each of the two shafts is provided with two fastening holes, and two fastening members are locked in the two fastening holes of each of the two shafts. Each of the two operation gears has a periphery provided with a plurality of toothed portions and a plurality of push grooves arranged between the toothed portions. Each of the toothed portions has a release face. Each of the two arms of the base is provided with a first slideway, and a first push member is slidably mounted in the first slideway of each of the two arms. The first push member is provided with two push portions each corresponding to the push grooves of one of the two operation gears. The first slideway of each of the two arms is provided with a locking recess, and a torsion spring is mounted in the locking recess of each of the two arms. The torsion spring has two resting portions abutting the first push member and the base respectively. The driving member is provided with a slot, and a stop plate located in the slot. The stop plate of the driving member is provided with a positioning hole. Each of the two ears of the driving member is provided with a second slideway, and a second push member is slidably mounted in the second slideway of each of the two ears. The second push member is provided with two push portions each corresponding to the push grooves of one of the two operation gears. The second push member is provided with a control portion passing through the slot of the driving member. The control portion of the second push member is provided with an opening corresponding to the stop plate of the driving member. The second push member is provided with an insert inserted into the positioning hole of the stop plate. An elastic member is mounted on the insert of the second push member and is biased between the stop plate of the driving member and a side of the opening of the control portion.

According to the primary advantage of the present invention, the driving member is driven reciprocally to wind and tighten the safety belt gradually, such that the tension of the safety belt is adjusted by driving the driving member, thereby facilitating the user adjusting the tension of the safety belt.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
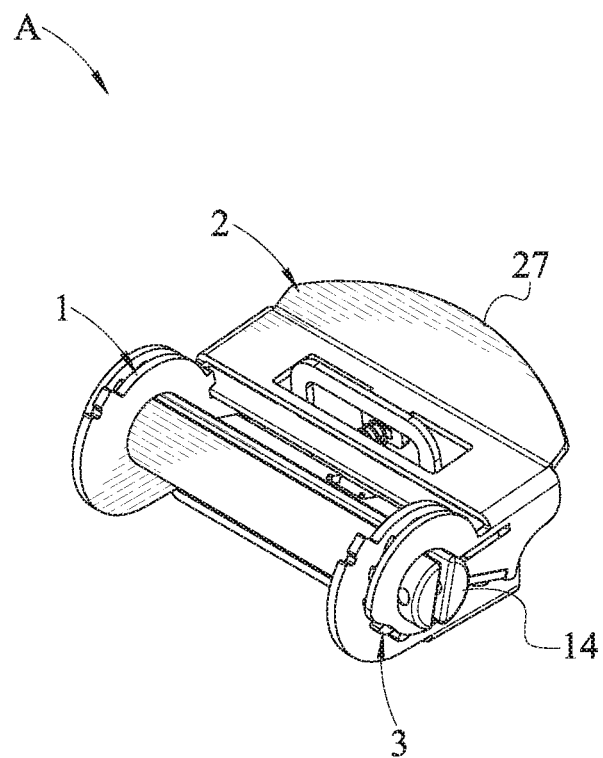
FIG. 1 is a perspective view of a winding device in accordance with the preferred embodiment of the present invention.

Referring to FIGS. 1-4, a winding (or rolling or scrolling or coiling or curling or wrapping) device 1 of a safety belt (or seat belt) in accordance with the preferred embodiment of the present invention comprises a base (or pedestal or bracket) 1, a driving member 2 and two operation gears (or driven gears or ratchet wheels) 3.

The base 1 is provided with two arms (or pivot portions or support portions) 12. The two arms 12 are formed on and extend upward from two ends of the base 1. Each of the two arms 12 is provided with a through hole 13. The base 1 is provided with a receiving section 11 located between the two arms 12.

The driving member 2 is provided with two ears (or mounting portions) 21. The two ears 21 are formed on and extend downward from two ends of the driving member 2. Each of the two ears 21 is provided with a mounting hole 22.

Each of the two operation gears 3 is located between one of the two arms 12 and one of the two ears 21. Each of the two operation gears 3 is provided with two apertures 31 and a partition (or limit portion) 32 located between the two apertures 31.

The winding device 1 further comprises two shafts (or pivot members or clamping members or semicircular rods or spools) 14 in turn extending through the through hole 13 of each of the two arms 12, each of the two apertures 31 of each of the two operation gears 3, and the mounting hole 22 of each of the two ears 21. A safety belt is clamped by the two shafts 14. The receiving section 11 of the base 1 provides a space to allow operation of the two shafts 14 for winding or unwinding the safety belt. Each of the two shafts 14 is provided with two fastening holes (or limit holes or perforations) 141 formed on two ends thereof, and two fastening members (or limit members or retaining members or pins) 142 are locked in the two fastening holes 141 of each of the two shafts 14, such that the base 1, the driving member 2 and each of the two operation gears 3 are connected pivotally. Thus, the base 1, the driving member 2 and each of the two operation gears 3 can be rotated. The partition 32 of each of the two operation gears 3 cooperates with the two fastening members 142, to prevent the two shafts 14 from being detached from the mounting hole 22 of each of the two ears 21, and to restrict the two shafts 14 to rotate in the receiving section 11 of the base 1.

Each of the two operation gears 3 has a periphery provided with a plurality of toothed portions 33 and a plurality of push grooves 332 arranged between the toothed portions 33. Each of the toothed portions 33 has a release face 331 which has an arcuate shape.

Each of the two arms 12 of the base 1 is provided with a first slideway 121, and a first push member 15 is slidably mounted in the first slideway 121 of each of the two arms 12. The first push member 15 is provided with two push portions 151 each corresponding to the push grooves 332 of one of the two operation gears 3. The two push portions 151 are formed on and extend from two ends of the first push member 15. The first slideway 121 of each of the two arms 12 is provided with a locking recess 1211, and a torsion spring 16 is mounted in the locking recess 1211 of each of the two arms 12. The torsion spring 16 has two resting portions 161 abutting (or pressing or resting on) the first push member 15 and the base 1 respectively, such that the two push portions 151 of the first push member 15 are pushed toward the two operation gears 3.

The driving member 2 is provided with a slot (or operation hole) 23, and a stop plate 231 located in the slot 23. The stop plate 231 of the driving member 2 is provided with a positioning hole 2311.

Each of the two ears 21 of the driving member 2 is provided with a second slideway 211, and a second push member 24 is slidably mounted in the second slideway 211 of each of the two ears 21. The second push member 24 is provided with two push portions 241 each corresponding to the push grooves 332 of one of the two operation gears 3. The two push portions 241 are formed on and extend from two ends of the second push member 24. The second push member 24 is provided with a control portion (or drawing portion or handle) 242 corresponding to and passing through the slot 23 of the driving member 2. The control portion 242 of the second push member 24 extends upward and is movably mounted in the slot 23 of the driving member 2. The control portion 242 of the second push member 24 is provided with an opening 2421 corresponding to the stop plate 231 of the driving member 2. The second push member 24 is provided with an insert 243 inserted into and movably mounted in the positioning hole 2311 of the stop plate 231. The insert 243 of the second push member 24 is arranged in the opening 2421 of the control portion 242. An elastic member 25 is mounted on the insert 243 of the second push member 24 and is biased between the stop plate 231 of the driving member 2 and a side of the opening 2421 of the control portion 242, such that the two push portions 241 of the second push member 24 are pushed toward the two operation gears 3.

In the preferred embodiment of the present invention, each of the two push portions 151 of the first push member 15 is provided with an arcuate face 1511 corresponding to the release face 331 of each of the toothed portions 33 of each of the two operation gears 3. Thus, the release face 331 of each of the toothed portions 33 of each of the two operation gears 3 is moved to push away the arcuate face 1511 of each of the two push portions 151 of the first push member 15, such that the first push member 15 is moved away from each of the two operation gears 3.

In the preferred embodiment of the present invention, each of the two push portions 241 of the second push member 24 is provided with an arcuate face 2411 corresponding to the release face 331 of each of the toothed portions 33 of each of the two operation gears 3. Thus, the release face 331 of each of the toothed portions 33 of each of the two operation gears 3 is moved to push away the arcuate face 2411 of each of the two push portions 241 of the second push member 24, such that the second push member 24 is moved away from each of the two operation gears 3.

In the preferred embodiment of the present invention, each of the two ears 21 of the driving member 2 is provided with a locking groove 26 corresponding to the first push member 15, and each of the two arms 12 of the base 1 is provided with a recessed retaining member (or stop portion) 19 corresponding to the second push member 24. Thus, when the second push member 24 rests on and is retained by the retaining member 19 of each of the two arms 12, the first push member 15 rests on and is locked in the locking groove 26 of each of the two ears 21, such that each of the two operation gears 3 is secured by the first push member 15. Thus, when the driving member 2 is secured, each of the two operation gears 3 is secured, and the first push member 15 is secured.

In the preferred embodiment of the present invention, the base 1 is provided with a securing portion 17 protruding outward. The securing portion 17 is provided with a securing hole 171. Thus, the base 1 is secured to a predetermined position of a car seat by the securing portion 17 and the securing hole 171.

In the preferred embodiment of the present invention, the driving member 2 is provided with a grip portion 27 extending outward and having an edge with an arcuate shape.

In the preferred embodiment of the present invention, the two fastening members 142 are secured in the two fastening holes 141 of each of the two shafts 14 by screwing. Each of the two fastening members 142 is embedded in each of the two fastening holes 141 of each of the two shafts 14, and has a length smaller than a diameter of the through hole 13 of each of the two arms 12.

In the preferred embodiment of the present invention, the base 1 is formed integrally by bending.

In the preferred embodiment of the present invention, the driving member 2 is formed integrally by bending.

In the preferred embodiment of the present invention, each of the two arms 12 of the base 1 has an upper end provided with a stop portion (or block) 18, and each of the two push portions 241 of the second push member 24 is moved to abut the stop portion 18 of each of the two arms 12, to restrict the maximum rotation angle of the driving member 2. The second push member 24 is driven by the driving member 2, and is rotated between the stop portion 18 and the retaining member 19 of each of the two arms 12.

Figure 2:
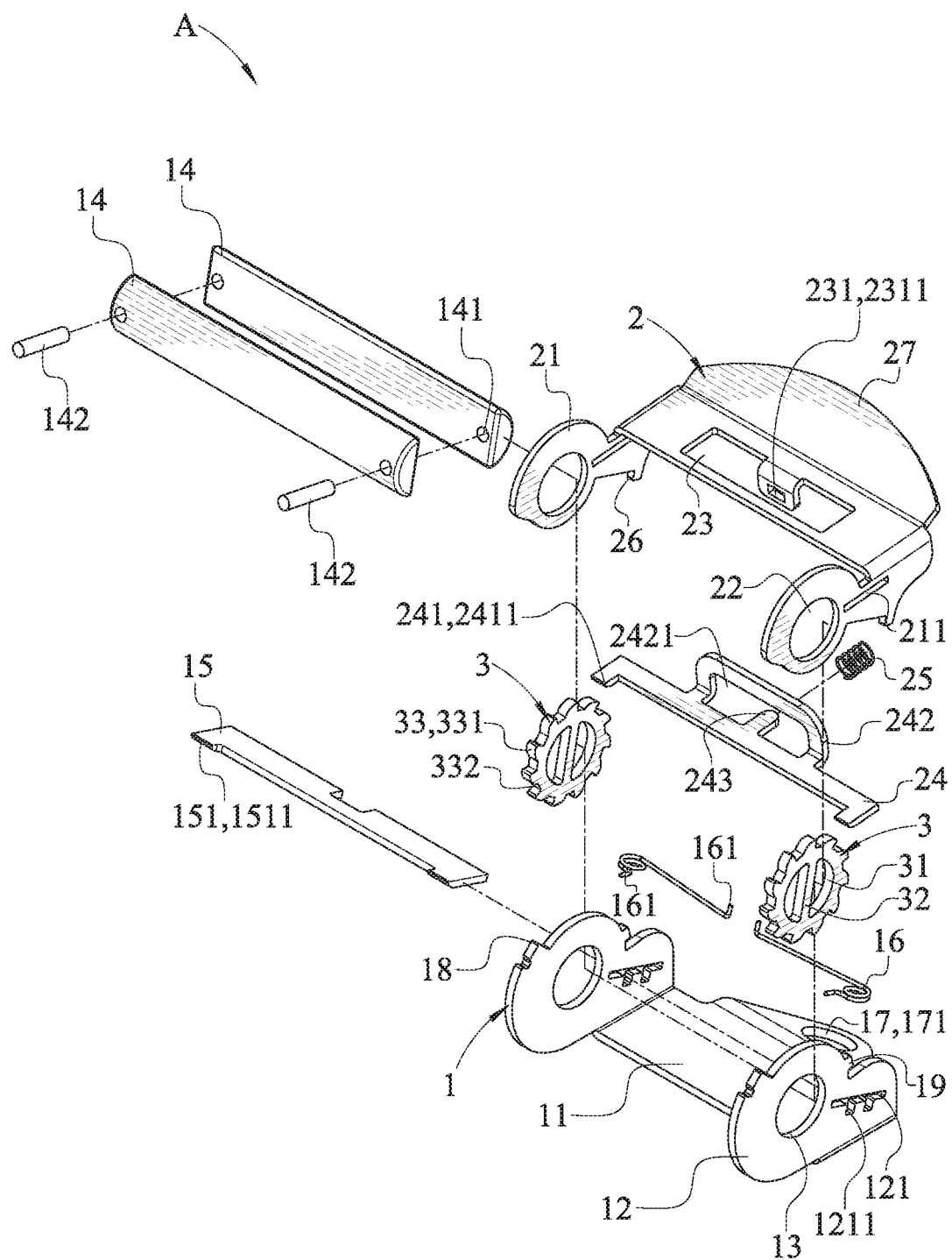
FIG. 2 is an exploded perspective view of the winding device in accordance with the preferred embodiment of the present invention.
Figure 3:
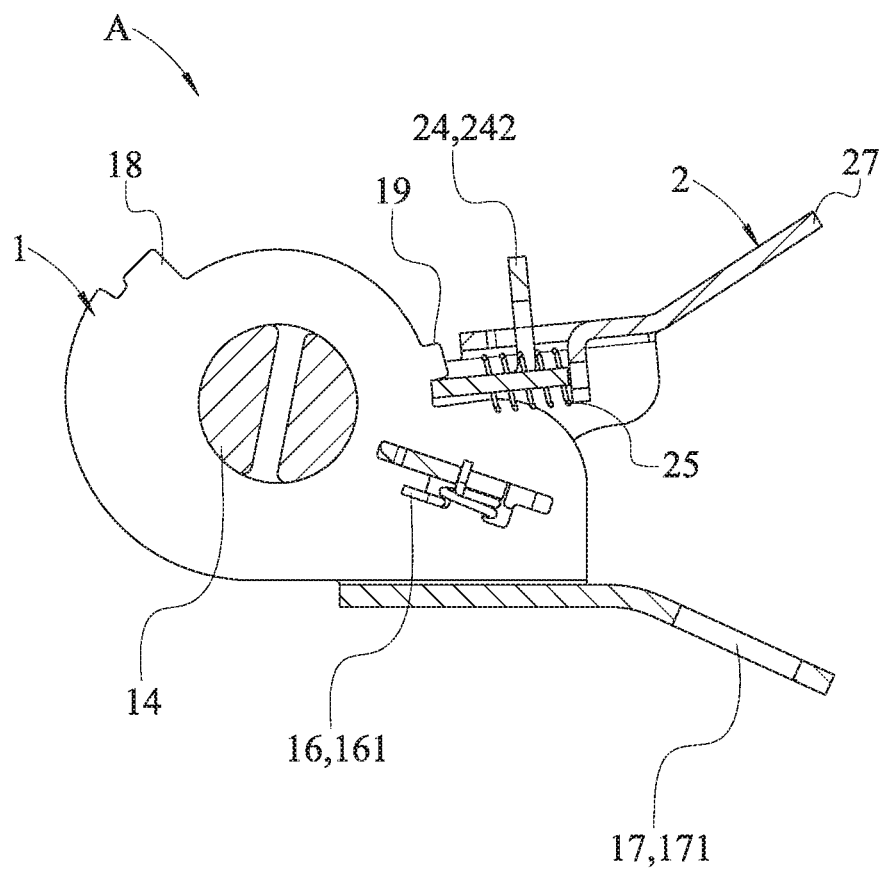
FIG. 3 is a cross-sectional view of the winding device in accordance with the preferred embodiment of the present invention.
Figure 4:
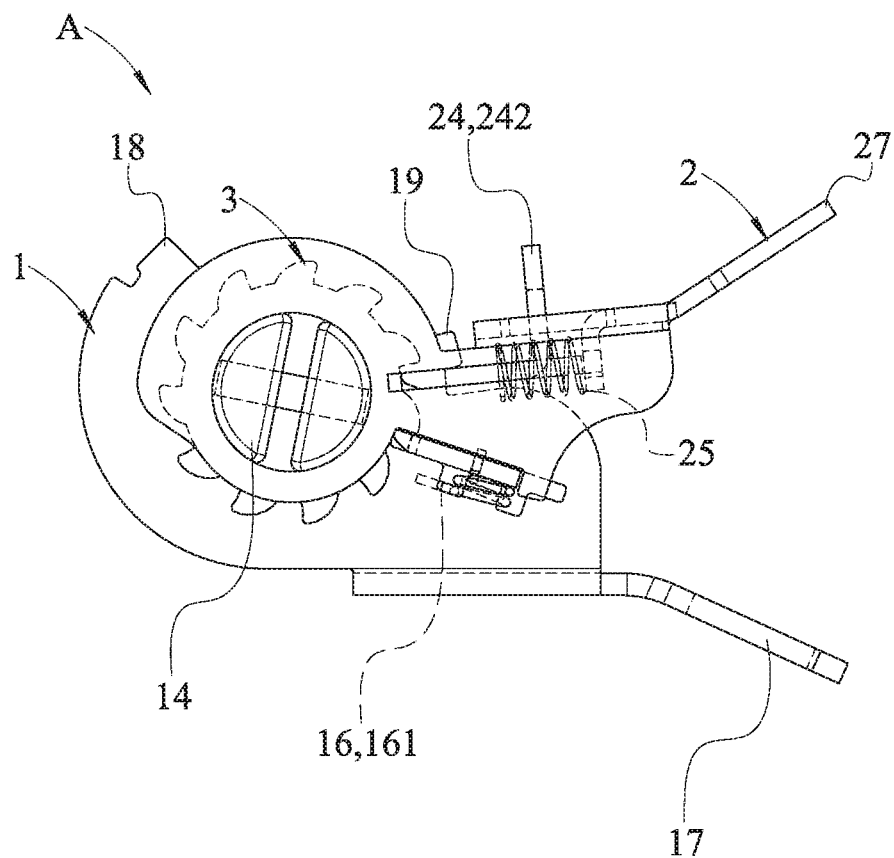
FIG. 4 is a schematic cross-sectional view of the winding device in accordance with the preferred embodiment of the present invention.

In operation, referring to FIGS. 3 and 4 with reference to FIGS. 1 and 2, each of the two push portions 241 of the second push member 24 is received and locked in the push grooves 332 of each of the two operation gears 3, such that when the driving member 2 is rotated in the anticlockwise direction, the second push member 24 is moved by the driving member 2, and each of the two operation gears 3 is driven by the second push member 24 to rotate in the anticlockwise direction. At this time, the release face 331 of each of the toothed portions 33 of each of the two operation gears 3 is moved to push away the arcuate face 1511 of each of the two push portions 151 of the first push member 15, such that the first push member 15 is pushed and moved away from each of the two operation gears 3 when each of the two operation gears 3 is rotated in the anticlockwise direction.

On the contrary, when the driving member 2 is rotated in the clockwise direction, the second push member 24 is also moved by the driving member 2. At this time, each of the two push portions 151 of the first push member 15 is received and locked in the push grooves 332 of each of the two operation gears 3, such that each of the two operation gears 3 is locked by the first push member 15 and cannot be rotated any more. At the same time, the release face 331 of each of the toothed portions 33 of each of the two operation gears 3 pushes away the arcuate face 2411 of each of the two push portions 241 of the second push member 24, such that the second push member 24 is moved away from each of the two operation gears 3 when the driving member 2 is rotated in the clockwise direction.

In conclusion, when the driving member 2 is rotated in the anticlockwise direction, each of the two operation gears 3 is rotated in concert with the driving member 2, and when the driving member 2 is rotated in the clockwise direction, each of the two operation gears 3 stops rotating, and the driving member 2 performs an idle rotation. In such a manner, when the driving member 2 is rotated to and fro reciprocally, each of the two operation gears 3 is limited by the first push member 15, and performs a oneway rotation, such that the two shafts 14 are rotated in one direction only, so as to wind and tighten the safety belt.

When the user wishes to loosen the safety belt, the first push member 15 is driven manually to detach each of the two push portions 151 of the first push member 15 from the push grooves 332 of each of the two operation gears 3, while the second push member 24 is driven manually by the control portion 242 of the second push member 24, to detach each of the two push portions 241 of the second push member 24 from the push grooves 332 of each of the two operation gears 3, such that each of the two operation gears 3 is rotated freely in two directions, so as to unwind and loosen the safety belt.

Accordingly, the driving member 2 is driven reciprocally to wind and tighten the safety belt gradually, such that the tension (or tightness or elasticity) of the safety belt is adjusted by driving the driving member 2, thereby facilitating the user adjusting the tension of the safety belt.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A winding device comprising:
a base, a driving member and two operation gears; wherein:
the base is provided with two arms;
each of the two arms is provided with a through hole;
the base is provided with a receiving section located between the two arms;
the driving member is provided with two ears;
each of the two ears is provided with a mounting hole;
each of the two operation gears is provided with two apertures and a partition located between the two apertures;
the winding device further comprises two shafts in turn extending through the through hole of each of the two arms, each of the two apertures of each of the two operation gears, and the mounting hole of each of the two ears;
each of the two shafts is provided with two fastening holes;
two fastening members are locked in the two fastening holes of each of the two shafts;
each of the two operation gears has a periphery provided with a plurality of toothed portions and a plurality of push grooves arranged between the toothed portions;
each of the toothed portions has a release face;
each of the two arms of the base is provided with a first slideway;
a first push member is slidably mounted in the first slideway of each of the two arms;
the first push member is provided with two push portions each corresponding to the push grooves of one of the two operation gears;
the first slideway of each of the two arms is provided with a locking recess;
a torsion spring is mounted in the locking recess of each of the two arms;
the torsion spring has two resting portions abutting the first push member and the base respectively;
the driving member is provided with a slot, and a stop plate located in the slot;
the stop plate of the driving member is provided with a positioning hole;
each of the two ears of the driving member is provided with a second slideway;
a second push member is slidably mounted in the second slideway of each of the two ears;
the second push member is provided with two push portions each corresponding to the push grooves of one of the two operation gears;
the second push member is provided with a control portion passing through the slot of the driving member;
the control portion of the second push member is provided with an opening corresponding to the stop plate of the driving member;
the second push member is provided with an insert inserted into the positioning hole of the stop plate; and
an elastic member is mounted on the insert of the second push member and is biased between the stop plate of the driving member and a side of the opening of the control portion.

2. The winding device of claim 1, wherein each of the two push portions of the first push member is provided with an arcuate face corresponding to the release face of each of the toothed portions of each of the two operation gears.

3. The winding device of claim 1, wherein each of the two push portions of the second push member is provided with an arcuate face corresponding to the release face of each of the toothed portions of each of the two operation gears.

4. The winding device of claim 1, wherein:
each of the two ears of the driving member is provided with a locking groove corresponding to the first push member, and each of the two arms of the base is provided with a retaining member corresponding to the second push member; and
when the second push member rests on the retaining member of each of the two arms, the first push member rests on and is locked in the locking groove of each of the two ears.

5. The winding device of claim 1, wherein the base is provided with a securing portion, and the securing portion is provided with a securing hole.

6. The winding device of claim 1, wherein the driving member is provided with a grip portion having an edge with an arcuate shape.

7. The winding device of claim 1, wherein the two fastening members are secured in the two fastening holes of each of the two shafts by screwing, and each of the two fastening members is embedded in each of the two fastening holes of each of the two shafts, and has a length smaller than a diameter of the through hole of each of the two arms.

8. The winding device of claim 1, wherein the base is formed integrally by bending.

9. The winding device of claim 1, wherein the driving member is formed integrally by bending.

10. The winding device of claim 1, wherein each of the two arms of the base has an upper end provided with a stop portion, and each of the two push portions of the second push member is moved to abut the stop portion of each of the two arms, to restrict a rotation angle of the driving member.

* * * * *